(12) United States Patent
Dalvi et al.

(10) Patent No.: US 9,420,524 B1
(45) Date of Patent: Aug. 16, 2016

(54) ADAPTIVE MULTIMODAL PROVISIONING FOR WIRELESS SENSORS

(71) Applicant: MARVELL INTERNATIONAL LTD., Hamilton (BM)

(72) Inventors: Sandip Rakhmaji Dalvi, Pune (IN); Amey Dattatray Inamdar, Pune (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 64 days.

(21) Appl. No.: 14/156,262

(22) Filed: Jan. 15, 2014

Related U.S. Application Data

(60) Provisional application No. 61/752,781, filed on Jan. 15, 2013.

(51) Int. Cl.
*H04W 76/02* (2009.01)
*H04W 48/16* (2009.01)
*H04W 24/02* (2009.01)
*H04W 88/06* (2009.01)

(52) U.S. Cl.
CPC .............. *H04W 48/16* (2013.01); *H04W 24/02* (2013.01); *H04W 76/023* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,220,012 B1 | 12/2015 | Inamdar | |
| 2004/0034771 A1 | 2/2004 | Edgett et al. | |
| 2005/0021781 A1 | 1/2005 | Sunder et al. | |
| 2007/0105552 A1* | 5/2007 | Hun et al. | 455/434 |
| 2007/0254614 A1 | 11/2007 | Muralidharan et al. | |
| 2008/0069105 A1 | 3/2008 | Costa et al. | |
| 2011/0103264 A1* | 5/2011 | Wentink | 370/255 |
| 2011/0211219 A1 | 9/2011 | Bradley et al. | |
| 2012/0008529 A1 | 1/2012 | Averbuch et al. | |

FOREIGN PATENT DOCUMENTS

WO  WO-2009/059229 A1  5/2009

OTHER PUBLICATIONS

Netgear, Universal WiFi Range Extender WN3000RP User Manual (202-10789-01, v1.0), Jun. 2011, 32 pages.*

(Continued)

*Primary Examiner* — Hoon J Chung

(57) ABSTRACT

Methods, systems, and apparatus are described for provisioning wireless communication devices. One embodiment includes a communication device that determines an operating channel corresponding to an AP having the highest received signal strength measurement. The communication device operates in an AP mode with another communication device on this same channel to facilitate provisioning of the other communication device with the AP. Another embodiment includes a communication device that operates as a station in a first wireless network and as an AP in a second wireless network with another communication device. The communication device determines a transmission time waiting interval corresponding to communication device AP mode transmissions and divides the channels into groups that can be scanned within the transmission time waiting interval. The communication device scans these channel subgroups to identify other APs available for provisioning the other communication device.

18 Claims, 7 Drawing Sheets

(56) References Cited

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc..*, pp. 1-512 (1999).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc..*, pp. 1-92, (1999) Reaffirmed (Jun. 12, 2003).

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE P802.11n™/D3.00, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Chen, "Home Network Basis: Transmission Environments and Wired/Wireless Protocols," *Prentice Hall*, pp. 1-26 (Jul. 2003).

Hiertz, et al., "The IEEE 802.11 Universe," *IEEE Communications Magazine*, pp. 62-70, (Jan. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

(56) References Cited

OTHER PUBLICATIONS

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Stacey et al., "Specification Framework for TGac," document No. IEEE 802.11-09/0992r20, *Institute for Electrical and Electronics Engineers*, pp. 1-49, (Jan. 18, 2011).

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).

van Nee, et al. "The 802.11n MIMO-OFDM Standard for Wireless LAN and Beyond," Wireless Personal Communications, vol. 37, pp. 445-453 (Jun. 2006).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*, 200 pages (2008).

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*, pp. 1-201 (2009).

IEEE Std 802.15.4™-2011 (Revision of IEEE Std 802.15.4-2006) "IEEE Standard for Local and metropolitan area networks—Part 15.4: Low-Rate Wireless Personal Area Networks (LR-WPANs)," *The Institute of Electrical and Electronics Engineers, Inc.* pp. 1-314 (Sep. 5, 2011).

Harada, "Project: IEEE P802.15 Working Group for Wireless Personal Area Network (WPANs)," IEEE 802.15-07-0693-003c, slides 24-33 (May 2007).

Pyo et al., "Throughput Analysis and Improvement of Hybrid Multiple Access in IEEE 802.13.3c mm-wave WPAN," IEEE J. on Selected Areas in Communications, vol. 27, No. 8, pp. 1414-1424 (Oct. 1, 2009).

IEEE Std. 802.11™2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std. 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

IEEE Std. 802.11af/D1.05 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: TV White Spaces Operation," The Institute of Electrical and Electronics Engineers, Inc., pp. 1-123 (Nov. 2011).

IEEE Std. 802.11ah™/D1.0 "Draft Standard for Information Technology-Telecommunications and information exchange between systems Local and metropolitan area networks-Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std. 802.11v™/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, 426 pages (Aug. 2010).

"Wi-Fi Display Technical Specification Version 1.0.0", Wi-Fi Alliance® Technical Committee, Wi-Fi Display Technical Task Group, 149 pages (Aug. 24, 2012).(Nov. 4, 2004).

"Wi-Fi Peer-to-Peer (P2P) Technical Specification, Version 1.00", Wi-Fi Alliance, pp. 1-135, Dec. 1, 2009.

\* cited by examiner

ADAPTIVE MULTIMODAL PROVISIONING FOR WIRELESS SENSORS

CROSS REFERENCE TO RELATED APPLICATIONS AND INCORPORATION BY REFERENCE

This application claims the benefit of U.S. Provisional Application No. 61/752,781, entitled "ADAPTIVE MULTIMODAL PROVISIONING FOR WIRELESS SENSORS," and filed on Jan. 15, 2013, the disclosure of which is hereby incorporated herein by reference in its entirety.

FIELD OF THE DISCLOSURE

The present disclosure relates generally to communication networks and, more particularly, to provisioning of devices in wireless local area networks such as in-home wireless networks.

BACKGROUND

Wi-Fi networks, such as the Institute for Electrical and Electronics Engineers (IEEE) 802.11a, 802.11b, 802.11n or 802.11ac networks are now commonly used within the home. In addition to providing network connectivity to computing devices such as laptop computers and smartphones, these home networks can provide connectivity to various "smart" devices in the home, such as thermostats, water heaters, light control units, etc. To gain access to the home network, a new device generally must first be "provisioned." Provisioning is a process by which a Wi-Fi-enabled device obtains network credentials that enable secure connection to the home network. Once connected, the device can access various services, such as Internet services, through the Wi-Fi access point (AP). As just one example, if a Wi-Fi-enabled thermostat is connected to the home network, a home owner may use an application running on a smartphone to remotely control the temperature in his or her home via the Internet.

For conventional home networks, a user (e.g., home owner, home resident, etc.) typically must perform various actions to provision a Wi-Fi-enabled device. A first, "microAP-based" technique may be used if a device to be connected supports a microAP mode in which the device can host its own Wi-Fi network. With this technique, appropriate security credentials are used to associate a client (e.g., a laptop or other personal computer) with a wireless network hosted by the device to be provisioned/connected. Next, the user opens a web browser on the client and starts a provisioning web application. The user then views scan results provided by the device and selects the desired home network. Finally, the user provides the appropriate home network security credentials, and verifies that the device can connect to the home network.

A second technique, known as "Wi-Fi Protected Setup" or "WPS," includes PIN code and push button varieties. WPS may be used if both the AP of the home network and the device to be provisioned/connected support WPS-based provisioning. With WPS PIN code provisioning, a user may enter a printed and/or displayed numeric PIN code displayed on the device at the AP of the home network (e.g., via a web interface). With push button WPS, a user presses a physical button on both the AP of the home network and the device or presses a "virtual button" displayed via a user interface at the home network AP. The two buttons are generally pressed within a time window, which may be inconvenient when the AP and the device are not in close proximity. Moreover, the button on the device to be provisioned/connected may not be easily accessible (e.g., if the device is a water heater).

Since smart devices may not be designed to easily accept user input (e.g., "headless" devices without keyboards, displays, etc.) provisioning these devices may be accomplished by first connecting the smart device to device that has user input capabilities, and using this device to provision the smart device. Furthermore, home networks may include a mix of devices implementing these various provisioning systems. Ensuring that these mixed device networks allow for provisioning of new devices while not impacting devices already provisioned and connected to the network presents design challenges. Furthermore, with regards to microAP provisioning, supporting dual AP and station roles also presents challenges for maintaining support for devices connected to a device while operating in microAP mode while gathering updated information about APs available to the microAP while operating as a station.

SUMMARY OF THE DISCLOSURE

Methods, systems, and apparatus are described for provisioning wireless communication devices.

An embodiment describes a first communication device including a signal strength measurement module configured to measure a received signal strength associated with transmissions from a plurality of access points (APs). The first communication device further includes a controller configured to determine an operating channel corresponding to an AP from the plurality of APs having a highest received signal strength measurement, to determine an operating channel of the AP, and to operate the communication device in an AP mode in a first wireless network with a second communication device that is the same as the operating channel of the AP. Further in accordance with this embodiment, the controller is configured to operate the first communication device in a station mode in a second wireless network with the AP to facilitate provisioning of the second communication device with the AP.

Another embodiment describes a first communication device including a controller configured to: (i) operate a first communication device as a station in a first wireless network with a first access point (AP) conforming to a communications protocol having a plurality of channels, and (ii) operate the communication device as a second AP in a second wireless network with a second communication device. Further in accordance with this embodiment, the controller is configured to determine a transmission time waiting interval corresponding to transmissions from the first communication device to the second communication device while the first communication device operates as the second AP and to determine a number of channels from the plurality of channels that can be scanned within the transmission time waiting interval while the first communication device operates as the station. The embodiment further includes a channel grouping module configured to group of the plurality of channels into a plurality of channel subgroups based on the determined number of channels. Further in accordance with this embodiment, the controller is configured to scan a channel subgroup from the plurality of channel subgroups within the transmission time waiting interval to identify APs other than the first AP while the first communication device operates as the station.

Another embodiment describes a method, implemented in a first communication device, including operating the first communication device as a station in a first wireless network with a first access point (AP) conforming to a communications protocol having a plurality of channels and operating the first communication device as a second AP in a second wireless network with a second communication device. The method further includes determining, by the first communication device, a transmission time waiting interval corresponding to transmissions from the first communication device to the second communication device while the first communication device operates as the second AP and determining, by the first communication device, a number of channels from the plurality of channels that can be scanned within the transmission time waiting interval while the first communication device operates as the station. The method further includes grouping, by the first communication device, the plurality of channels into a plurality of channel subgroups based on the determined number of channels and scanning, by the first communication device, a channel subgroup from the plurality of channel subgroups within the transmission time waiting interval to identify APs other than the first AP while the first communication device operates as the station.

DETAILED DESCRIPTION

Figure 1:
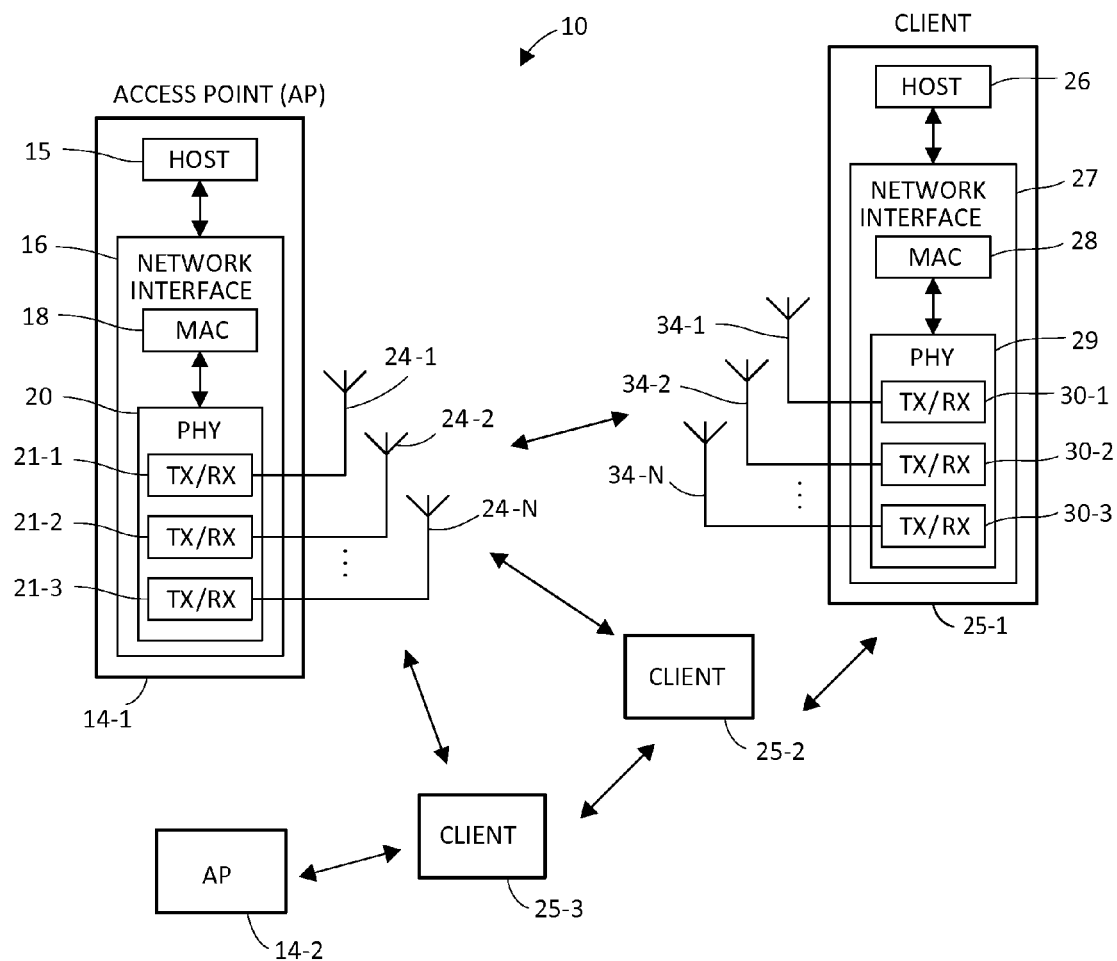
FIG. 1 is a block diagram of an exemplary network 10 in which one or more communication devices utilize adaptive provisioning techniques in accordance with various embodiments of the present disclosure.

FIG. 1 is a block diagram of an exemplary network 10 in which one or more communication devices utilize adaptive provisioning techniques in accordance with various embodiments of the present disclosure. Network 10 includes a plurality of access points (APs) 14. Although two APs 14 are illustrated in FIG. 1, various embodiments of network 10 include any number (e.g., 1, 2, 3, 5, 6, etc.) of APs 14. An access point (AP) 14-1 includes a host processor 15 coupled to a network interface 16. Network interface 16 includes a medium access control (MAC) unit 18 and a physical layer (PHY) unit 20. PHY unit 20 includes a plurality of transceivers 21, which are coupled to a plurality of antennas 24. As will be appreciated by those of skill in the art, although three transceivers 21 and three antennas 24 are illustrated in FIG. 1, various embodiments of AP 14-1 include any number (e.g., 1, 2, 4, 5, etc.) of transceivers 21 and antennas 24. Further in accordance with various embodiments, any number of transceivers 21 can be coupled to any number of antennas 24, such that one or more antennas are shared between transceivers and vice versa.

In accordance with various embodiments of the present disclosure, AP 14-2 has a structure the same as or substantially similar to AP 14-1. In accordance with such embodiments, AP 14-2 includes any suitable number of transceivers and antennas. For example, although AP 14-1 is illustrated as having three transceivers 21 and antennas 24, various embodiments of AP 14-2 can have two transceivers and two antennas, etc. The number of antennas and transceivers associated with AP 14-2 is not shown in FIG. 1 for purposes of brevity.

Network 10 includes a plurality of client stations 25. Although three client stations 25 are illustrated in FIG. 1, various embodiments of network 10 include any number (e.g., 1, 2, 3, 5, 6, etc.) of client stations 25. A client station 25-1 includes a host processor 26 coupled to a network interface 27. Network interface 27 includes a MAC processing unit 28 and a PHY processing unit 29. PHY processing unit 29 includes a plurality of transceivers 30, which are coupled to a plurality of antennas 34. Although three transceivers 30 and three antennas 34 are illustrated in FIG. 1, various embodiments of client station 25-1 include any number (e.g., 1, 2, 4, 5, etc.) of transceivers 30 and antennas 34.

In accordance with various embodiments of the present disclosure, any number of client stations 25-2 and 25-3 has a structure the same as or substantially similar to client station 25-1. In accordance with such embodiments, client stations 25 structured the same as or substantially similar to client station 25-1 include any suitable number of transceivers and antennas. For example, although client station 25-1 is illustrated as having three transceivers 34 and antennas 30, various embodiments of client station 25-2 can have two transceivers and two antennas, etc. The number of antennas and transceivers associated with clients 25-2 and 25-3 is not shown in FIG. 1 for purposes of brevity.

Network 10 supports communications in accordance with any number of suitable communication protocols, such as cellular protocols, wireless local area network (WLAN) communication protocols specified by one or more IEEE standards, BLUETOOTH®, WiMAX, etc. Examples of suitable IEEE standards include 802.11a, 802.11, g, 802.11n, 802.11ac, 802.11ad, 802.11af, 802.11v, and/or 802.11ah standards. Although AP 14-1 is labeled as an access point, various embodiments of AP 14-1 are configured to support any suitable type of wireless communications and are not limited to supporting only WLAN technologies. For example, various embodiments of AP 14-1 are configured to support WLAN and/or cellular protocols such as 3rd Generation Partnership Project (3GPP) technologies including Long Term Evolution (LTE) protocols. Although FIG. 1 illustrates only a single AP 14, various embodiments of client devices 25 are configured to communicate with more than a single AP at any time, including simultaneous communications with separate APs using communication protocols that may be the same or different from one another. In accordance with an embodiment of the present disclosure, AP 14 and client stations 25 are configured to transmit and receive data conforming to one or more communication protocols and/or IEEE 802.11 standards. In accordance with another embodiment of the present disclosure, client stations 25 are configured to transmit and receive data with one another conforming to one or more communication protocols and/or IEEE 802.11 standards to support ad-hoc networking.

In various embodiments, APs 14 and/or clients 25 may implement any suitable provisioning system. For example, client 25-3 may implement a microAP system, client 25-2 may implement a WPS PIN system, and client 25-1 may implement a WPS push button system. In accordance with an embodiment in which client 25-3 implements a microAP system, client 25-3 supports communications in a first network operating as a station (STA) with AP 14-1. Further in accordance with such embodiments, client 25-3 supports communications in a second network operating as an access point for one or more of client 25-1 and/or client 25-2. APs 14 and clients 25 in network 10 may include any suitable combination of different provisioning systems.

In accordance with various embodiments, any of clients 25 are provisioned to AP 14-1 or AP 14-2 based on their respective implemented provisioning system. Since clients 25 are provisioned along separate executable paths (i.e., the wireless links to AP 14-1 and/or AP 14-2) this provisioning may be done without impacting other clients already connected to AP 14-1 and/or AP 14-2. Assuming client 25-3 is already provisioned with AP 14-1 and communicates with AP 14-1, in an embodiment in which client 25-3 implements a microAP provisioning system, client 25-3 optionally operates in both an STA mode with AP 14-1 and in an AP mode with client 25-1 and/or client 25-2. Further in accordance with such an embodiment, client 25-1 and/or client 25-2 communicate with client 25-3 over a first communication channel, while AP 14-1 communicates with client 25-3 on a second communications channel. These first and second communication channels could be the same or different channels. In the case when these first and second channels are different from one another, the connections between clients 25-1 and/or 25-2 and client 25-3 may be dropped when client 25-3 attempts to provision client 25-1 and/or client 25-2 to AP 14-1. This dropped connection occurs as a result of client 25-3 changing its channel to match the operating channel of AP 14-1 to initiate the provisioning process, which leads to clients 25-1 and/or 25-2 no longer communicating with client 25-3 on the same channel.

Therefore, in accordance with various embodiments, a client device 25, such as client 25-3, for example, implementing a microAP, scans available APs within range (such as APs 14-1 and 14-2, for example) and measures their corresponding transmission signal strength received at client 25-3. Further in accordance with such embodiments, client device 25-3 determines the operating channel of the AP with the strongest signal from AP 14-1 and AP 14-2, which is assumed to be AP 14-1 in this example. Once the channel of AP 14-1 is determined, the microAP then operates client 25 in an AP mode to communicate with clients 25-1 and/or 25-2 on the same channel as AP 14-1. If client 25-3 receives signals transmitted from AP 14-1 as having the strongest signal strength, AP 14-1 will most likely be selected as the AP for provisioning with clients 25-1 and/or 25-2. As a result, setting the channel of microAP to match AP 14-1 helps ensure client 25-1 and/or client 25-2 operate on the same channel as client 25-3 when client 25-3 starts provisioning client 25-1 and/or 25-2 to AP 14-1. Since client 25-3 communicates with AP 14-1 and client 25-1 and/or client 25-2 when provisioning is started, client 25-3 is able to continuously provide connectivity with client 25-1 and/or client 25-2 throughout the provisioning process and to provide feedback to client 25-1 and/or client 25-2 regarding the success of the provisioning.

Furthermore, in embodiments in which client 25-3 implements a microAP provisioning system, client 25-3 scans communication channels while operating in STA mode. For example, if AP 14-1 and client 25-3 communicate with one another in accordance with a Wi-Fi protocol, AP 14-2 could be broadcasting over one of several channels, which could be the same or different than that of AP 14-1. From these channel scans, client 25-3 may determine that an additional AP (such as AP 14-2 in this example) is in its proximity and update this information for future use. In other words, by keeping this information updated, client 25-3 provides feedback to a user if client 25-3 needs to be provisioned in the future to a different AP. Furthermore, information regarding available APs may be used by client 25-3 if client 25-1 and/or client 25-2 require such information to determine available APs for provisioning via client 25-3.

In an embodiment, communication protocols used within network 10 include Wi-Fi protocols, which utilize a number of communication channels (e.g., 11). As a result, scanning all channels within a communication protocol for other APs within range of a client 25 may take considerable time. During this channel scanning time, other clients 25 connected to a client implementing a microAP system, such as client 25-3, for example, may disconnect if this scanning time prevents transmissions from client 25-3, since other clients may assume client 25-3 is no longer within range. Using this example, client 25-3 periodically transmits beacon information that is received by connected clients while operating in an AP mode. If the channel scanning takes too long, these beacons may not be transmitted within a suitable transmission time waiting interval that is expected by the connected clients, causing them to drop their connections to client 25-3.

Therefore, in accordance with various embodiments, a client 25 only scans a subgroup of the overall channels at one time, thereby fitting the scanning window within a transmission time waiting interval. In accordance with such embodiments, client 25 leaves time to transmit beacons and/or other information received by any connected clients between these scans. In accordance with various embodiments, client 25 implements a microAP provisioning system by repeatedly scanning these channel subgroups until all the channels have been scanned. In this way, client 25 scans channel subgroups operating in a STA mode while transmitting data in an AP mode frequently enough to maintain connectivity with its connected clients.

In accordance with various embodiments, a client implementing a microAP system determines how long the subgroup channel scanning will take to complete and adjusts the transmission time waiting interval to ensure the subgroup scanning fits within this scanning period. Further in accordance with various embodiments, a microAP client notifies connected clients to wait for broadcasted data based on the updated transmission time waiting interval.

Figure 2:
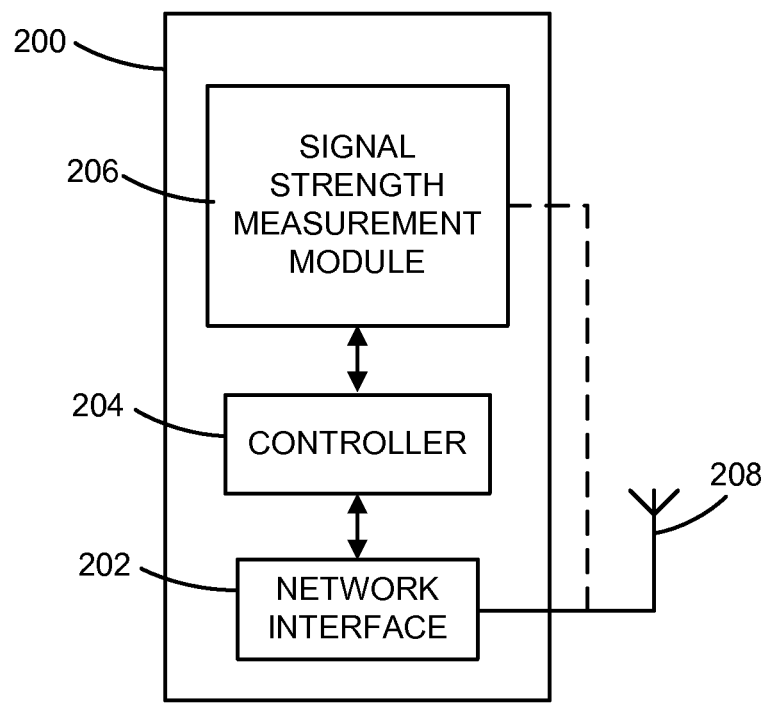
FIG. 2 is a block diagram of a channel selection system 200 in accordance with an embodiment of the present disclosure.

FIG. 2 is a block diagram of a channel selection system 200 in accordance with an embodiment of the present disclosure. Channel selection system 200 includes a network interface 202, a controller 204, a signal strength measurement module 206, and an antenna 208. In accordance with an embodiment of the present disclosure, channel selection system 200 is implemented within a first communication device that is a part of network 10, such as AP 14-1 and/or client 25-3, for example. In other embodiments, channel selection system 200 is implemented as part of any suitable communication device described throughout various embodiments of the present disclosure and is not limited to only those devices that are a part of network 10.

Network interface 202 is coupled to controller 204 and antenna 208 and is configured to communicate with controller 204. Network interface 202 is configured to transmit to and receive wireless communications from other communication device via antenna 208. In accordance with various embodiments, network interface 202 is configured to communicate with one or more communication devices via one more suitable communication protocols. As will be appreciated by those of skill in the relevant art(s), network interface 202 may be implemented with any number of media access controller (MAC) interfaces, MAC sublayer management entities, PHY management interfaces, station management entities (SMEs), transmitters, receivers, transceivers, etc.

In various embodiments, network interface 202 is an implementation of network interface 16 and/or network interface 27 as shown in FIG. 1 and is configured to facilitate communications in accordance with one or more wireless communications protocols. In accordance with such embodiments, network interface 202 facilitates communications between any suitable number of APs and/or other client devices. For example, network interface 202 optionally supports communications for the device in which it is implemented for STA and/or AP operational modes. In accordance with an embodiment, network interface 202 facilitates concurrent STA and AP operational modes.

Controller 204 is coupled to network interface 202 and signal strength measurement module 206 and is configured to communicate with network interface 202 and signal strength measurement module 206. In an embodiment, controller 204 includes any suitable number of processors and/or controllers configured to execute software and/or firmware instructions. Execution of these software and/or firmware instructions cause network interface 202 and/or signal strength measurement module 206 to accomplish their various functionalities and/or allows controller 204 to communicate with network interface 202 and/or signal strength measurement module 206. In an embodiment, controller 204 is a host processor, such as host processor 15 or 26 in FIG. 1, for example. Controller 204 is configured to receive data from network interface 202 and/or signal strength measurement module 206 and to process and/or perform calculations using on this data. Controller 204 is configured to send results of these processes and/or calculations to network interface 202 and/or signal strength measurement module 206.

Signal strength measurement module 206 is coupled to controller 204 and is configured to communicate with controller 204. In an embodiment, signal strength measurement module 206 is implemented as part of a memory device. In accordance with such embodiments, signal strength measurement module 206 is implemented as part of a volatile (e.g., a random access memory (RAM), or a non-volatile memory (e.g., battery backed RAM, FLASH, etc.). Further in accordance with such embodiments, signal strength measurement module 206 includes instructions that are executed by controller 204.

In accordance with various embodiments, signal strength measurement module 206 is configured to process data received from controller 204 independently from controller 204 or in combination with controller 204. As will be appreciated by those of skill in the relevant art(s), signal strength measurement module 206 may be implemented using any combination of power meters, analog-to-digital converters (ADCs), discrete components, etc. In accordance with various embodiments, signal strength measurement module 206 is alternatively or additionally coupled to antenna 208 to receive signals from other APs and/or clients and measure a corresponding signal strengths associated with such transmissions received via antenna 208. In an embodiment, the signal strength measurement is a received signal strength indicator (RSSI).

In accordance with various embodiments, controller 204 compares signal strength measurements from each AP within range of the device in which channel selection system 200 is implemented to determine an AP associated with the highest received signal strength transmission. Controller 204 is configured to coordinate communications received via signal strength measurement module 206 and network interface 202 to correlate measured signal strength transmissions and the corresponding AP from which they were transmitted.

Controller 204 is configured to determine an operating channel associated with each AP from which signal strength measurements are taken. In an embodiment, controller 204 determines this channel information from data sent from the APs, which is processed via network interface 202 and communicated to controller 204. Controller 204 is configured to cause network interface 202 to change an operating communication channel of network interface 202 to match the operating communication channel of the AP with the highest transmitted signal strength.

For example, assume that the device in which channel selection system 200 is implemented is client 25-3, as shown in FIG. 1. In accordance with such an example, client 25-3 operates on particular channel, such as channel 7, for example, to communicate with one or more communication devices while operating in an AP mode, such as client 25-1 and/or client 25-2, for example. Using this example, client 25-3 also operates in STA mode to communicate with the AP identified as the highest signal strength transmission on a particular channel, such as channel 4, for example, once a connection is made between client 25-3 and that AP, such as AP 14-1, for example. Controller 204 is configured to determine the channel associated with transmissions from AP 14-1 and to set its operating channel to this same channel when operating in an AP mode.

In the previous example, controller 204 communicates with network interface 202 to cause the device to communicate with its connected clients on channel 4 instead of channel 7. In this way, channel selection system 200 connects to its connected communication devices operating in an AP mode on the same channel as the AP with the highest received signal strength AP transmission. As a result, when the device in which channel selection system 200 is implemented facilitates provisioning of one or more connected communication devices to the same (highest signal strength) AP, the connection to the one or more connected clients is maintained without channel selection system 200 resetting, restarting, or reconnecting to this AP. Therefore, the power state of channel selection system 200 and/or the device in which it is implemented can remain the same throughout the provisioning process. Controller 204 is configured to maintain operation of the communication device in which it is implemented in the AP mode until provisioning has been completed, and/or to cause the communication device to notify the provisioned communication device when the provisioning has been completed.

Figure 3:
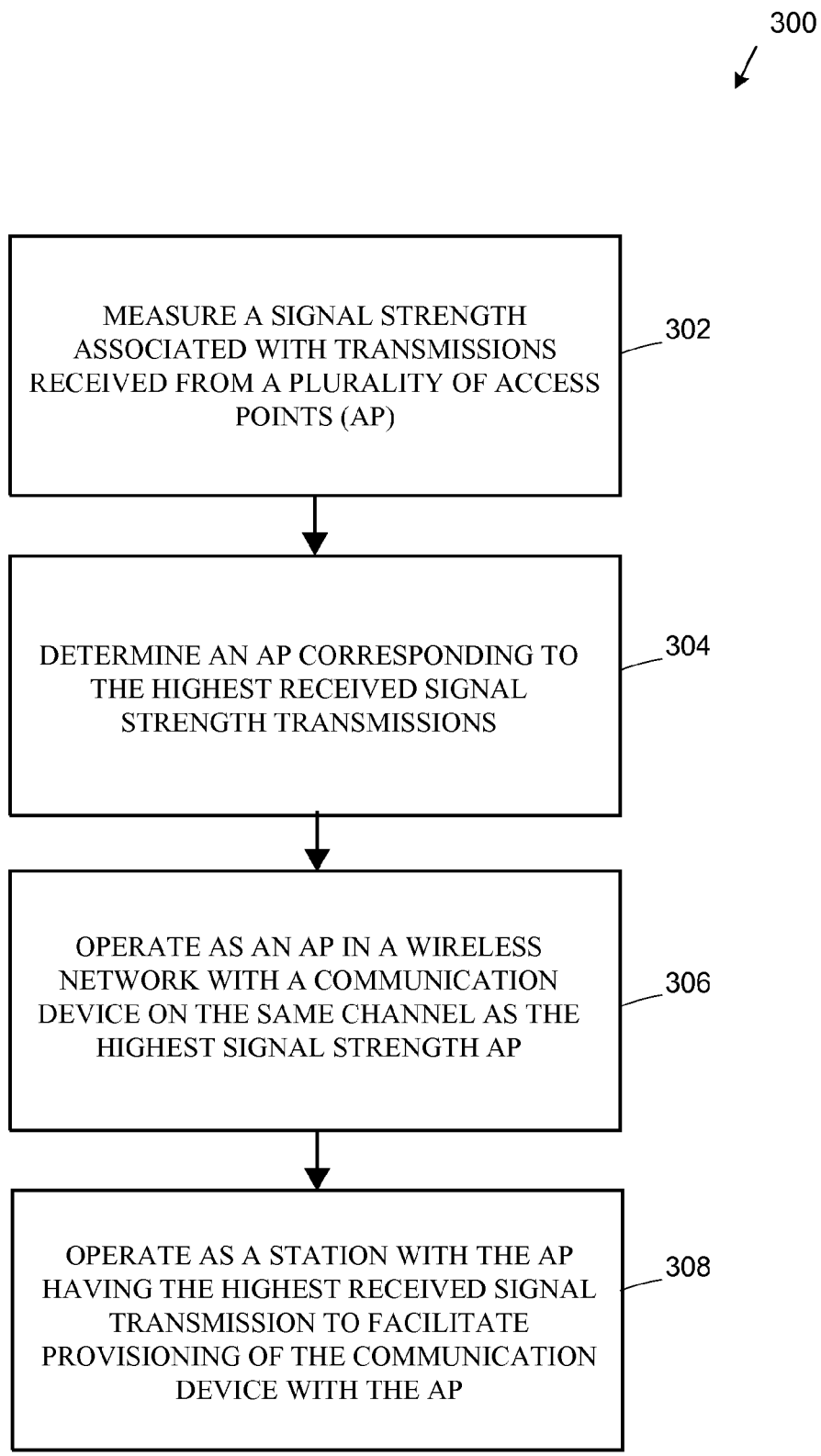
FIG. 3 illustrates a channel selection method 300 in accordance with an embodiment of the present disclosure.

FIG. 3 illustrates a channel selection method 300 in accordance with an embodiment of the present disclosure. In an embodiment, channel selection method 300 is implemented as part of channel selection system 200, as shown in FIG. 2.

Method 300 begins at block 302, at which a communication device measures a signal strength associated with transmissions received from a plurality of access points. This communication device could include, for example, client 25-3, as shown in FIG. 1. The plurality of APs could include, for example, AP 14-1 and 14-2, as shown in FIG. 1.

At block 304, the communication device determines the AP corresponding to the highest received signal strength transmission. This received signal strength transmission could be, for example, a transmission received at client 25-3 from AP 14-1, as shown in FIG. 1.

At block 306, the communication device operates as an AP with another communication device on the same channel as the identified highest received signal strength AP. This network could include, for example, client 25-3 communicating with client 25-1 and/or client 25-2, as shown in FIG. 1.

At block 308, the communication device operates as a station with the AP having the highest received signal strength transmission to facilitate provisioning of the communication device with the AP. This could include, for example, client 25-3 communicating with client 25-1 and/or client 25-3 in an AP mode to facilitate provisioning of client 25-1 and/or client 25-3 with AP 14-1, as shown in FIG. 1.

Figure 4:
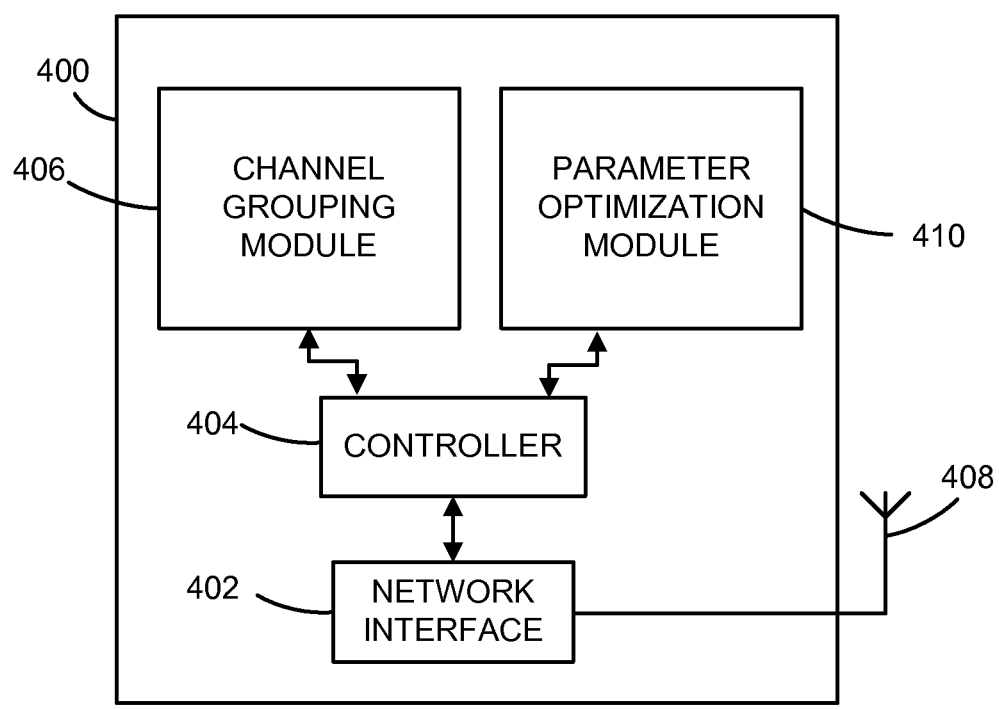
FIG. 4 is a block diagram of a microAP system 400 in accordance with an embodiment of the present disclosure.

FIG. 4 is a block diagram of a microAP system 400 in accordance with an embodiment of the present disclosure. MicroAP system 400 includes a channel grouping module 406, a parameter optimization module 410, a controller 404, a network interface 402, and an antenna 408. In accordance with various embodiments of the present disclosure, microAP system 400 is implemented as part of a communication device that is a part of network 10, such as client device 25-3, for example, as shown in FIG. 1. In accordance with further embodiments, microAP system 400 is implemented as part of any suitable communication device and is not limited to only those devices that are a part of network 10. Network interface 402, controller 404, and antenna 408 have a similar structure and operate substantially the same as network interface 202, controller 204, and antenna 208, respectively, as shown in FIG. 2. Therefore, only differences between these elements will be described.

Channel grouping module 406 and parameter optimization module 410 are each coupled to controller 404 and are configured to communicate with controller 404. In an embodiment, channel grouping module 406 and parameter optimization module 410 are each implemented as a memory device. In accordance with such embodiments, channel grouping module 406 and parameter optimization module 410 are implemented as a volatile (e.g., a random access memory (RAM), or a non-volatile memory (e.g., battery backed RAM, FLASH, etc.). Further in accordance with such embodiments, channel grouping module 406 and parameter optimization module 410 each include instructions stored in a memory device that are executed by controller 404.

In accordance with other embodiments, channel grouping module 406 and parameter optimization module 410 are each configured to process data received from controller 404 independently from controller 404 or in combination with controller 404. As will be appreciated by those of skill in the relevant art(s), channel grouping module 406 and parameter optimization module 410 each may be implemented with any combination of processors, controllers, etc. In accordance with various embodiments, any functions performed by channel grouping module 406 and/or parameter optimization module 410 are alternatively or additionally performed by controller 404. In accordance with various embodiments, channel grouping module 406 and/or parameter optimization module 410 are implemented as a part of controller 404.

Controller 404 causes network interface 402 to operate the device in which microAP system 400 is implemented as both a station and an AP. When operating as a station, controller 404 scans communications channels used for communications between the device in which microAP system 400 is implemented and APs via network interface 402. In various embodiments, controller 404 scans channels actively or passively. In active scanning embodiments, controller 404 causes network interface 402 to send requests to APs and then process responses sent back from APs answering these requests on each channel. In passive scanning embodiments, controller 404 causes network interface 402 to only listen for beacon frames transmitted from APs on each channel. This scanning enables controller 404 to determine a number of APs in range of microAP system 400, and provides a user with feedback regarding available APs for provisioning other devices. In accordance with various embodiments, active scanning and passive scanning are performed while controller 404 operates the device in which microAP system 400 is implemented in a station mode.

In an embodiment in which microAP system 400 communicates in accordance with a Wi-Fi protocol, N channels may be available for communications, depending on the specific Wi-Fi specification used. Since APs may be broadcasting on different channels to microAP system 400, it is preferable to scan each communications channel to detect each AP within range. Scanning through N communication channels can require considerable time (e.g., 100 ms per channel scanned). Furthermore, while operating in AP mode, microAP system 400 periodically sends out its own beacon frames to communication devices connected to it so communication devices are able to identify and discover microAP system 400. Since beacons frames are not transmitted during scanning windows, beacon frame transmission does not resume until the scanning is completed. If too much time passes before other communication devices receive the beacon frames from microAP system 400, these communication devices will assume that microAP system 400 is no longer available, and disconnect from microAP system 400.

To remedy this problem, channel grouping module 406 is configured to divide the total number of communication channels into smaller scanning subgroups, which are then repeatedly scanned by controller 404 until all channels are scanned. In this way, beacon frames are broadcasted between subgroup channel scans. Since scanning fewer channels results in faster scan windows, subgrouped channel scans allow beacon frames to be transmitted before communication devices disconnect from microAP system 400.

In various embodiments, channel grouping module 406 determines a channel subgrouping based on a predetermined subgrouping corresponding to a particular communication protocol. For example, for Wi-Fi communications in the United States, a typical frequency subgrouping could be represented as 1, 2-5, 6, 7-10, and 11. As will be appreciated by those of skill in the art, some channels (e.g., channel 6) are more commonly used than others, and therefore more APs may operate on these channels than others. As a result, channel grouping module 406 may group more commonly used channels alone, and less commonly used channels together.

In other embodiments, channel grouping module 406 determines a channel subgrouping dynamically based on APs found within one or more scanned communications channels. For example, if several APs are found on channel 8 in the previous subgrouping example, but not on other channels, channel grouping module 406 may select a new subgrouping represented as 1, 2-5, 6-7, 8, and 9-11. In this way, subgrouping module 406 dynamically adjusts to the network environment to optimize the channel subgrouping such that the time between beacon frame transmission is minimized.

For example, assume microAP system 400 is implemented within client 25-3, as shown in FIG. 1, and a communications protocol is implemented having 11 channels. In an embodiment using this example, channel grouping module 406 is divides the 11 channels, for example, into five groups of 2 channels each with a remaining single channel. Channel grouping module 406 communicates this channel subgroup scanning schedule to controller 404. Further in accordance with this embodiment and example, controller 404 scans the first two channels, while operating as a station, for APs within range. Controller 404 then broadcasts a beacon frame while operating as an AP after the APs are scanned in the first two channels. Controller 404 then scans the next two channels operating as a station, transmits the next beacon frame as an AP, and so on, until all 11 channels have been scanned for APs.

Parameter optimization module 410 is configured to optimize a communication parameter based on the channel subgrouping. In an embodiment, this communication parameter includes a transmission time waiting interval associated with a time communication devices connected to microAP system 400 wait for transmissions before disconnecting. This communication parameter is communicated to controller 404. Controller 404 causes this parameter to be transmitted to communication devices connected to microAP system 400 while microAP 400 operates in an AP mode. In accordance with an embodiment, communication devices connected to microAP system 400 receive this communication parameter and update their waiting time periods.

In an embodiment, this communication parameter is a delivery traffic indication message (DTIM) period value that is transmitted in a beacon frame. In such an embodiment, communication devices hosted by microAP system 400 will receive the DTIM period value and wait to receive data transmitted from microAP system 400 for a number of beacon frames specified by the DTIM period value.

In various embodiments, beacons are transmitted from microAP system 400 at regular known intervals while microAP system 400 operates in an AP mode. In addition, the scanning time for each channel is associated with a time duration. As a result, in accordance with such embodiments, parameter optimization module 410 selects the DTIM period value by calculating a number of beacon intervals that occur within a time period of a channel subgroup scan. For example, in the previous example of Wi-Fi communications with 11 available channels, a typical beacon transmission time may be 100 time units (TU), with a TU=1024 microseconds, or 102.4 milliseconds (ms). Furthermore, parameter optimization module 410 determines (or is notified by controller 404) the scanning time per channel subgroup based on the subgrouping selected by channel subgrouping module 406. For example, a typical scanning time per channel might be 100 ms. In such an example, a channel subgrouping of 1, 2-5, 6, 7-10, 11 selected by channel grouping module 406 would correspond to a scanning time for each subgroup of 100 ms, 400 ms, 100 ms, 400 ms, and 100 ms, respectively.

Based on the scanning time for each subgroup and the beacon transmission interval time periods, parameter optimization module 410 selects an appropriate DTIM period value to send to communication devices connected to microAP system 400. This DTIM period value ensures that those communication devices wait for data transmissions for a time period equal to a number of beacon intervals associated with the DTIM period value before disconnecting. Because parameter optimization module 410 determines the DTIM period value such that subgroup scanning is completed before this time period expires, scanning in each channel subgroup is completed before these devices disconnect.

In accordance with an embodiment, the DTIM period value is transmitted by microAP system 400 based on a "worst case" channel subgrouping scanning window. Using the previous example, the DTIM period value transmitted by microAP system 400 would be based on the 400 ms channel scanning window. In accordance with another embodiment, the DTIM period value is updated and transmitted after each channel subgrouping is completed based on the subsequent channel scanning window.

In accordance with various embodiments, controller 404 adjusts the channel scan duration time and notifies parameter optimization module of the adjusted value. This may be the case when, for example, a particular channel has many APs communicating on it and there is a risk that some APs will not be detected within the initial channel scan window. This may also be the case when, for example, few APs are found within a communications channel and the channel scan window could be reduced.

In accordance with such embodiments, controller 404 compares the number of APs found in each subgrouping channel to the initial maximum scan duration window. As will be appreciated by those of skill in the art, controller 404 determines a maximum number of APs that may be detected within any period of time based on processing speed, overhead, etc., and allots a time period per AP discovery based on this information. Furthermore, controller 404 compares a number of APs detected within a scan window to a maximum number of APs that can be detected within the same window based on this allotted time per AP. If the maximum number of APs is reached, controller 404 optionally increases the scan window. Furthermore, if the number of APs detected within a scan window is much less than is needed, controller 404 optionally reduces the scan window duration. This latter case may be true when, for example, the allotted time per AP is a small fraction (e.g., 10%) of the initial scan window, and the number of discovered APs within the window constitutes a time period less than some threshold proportion of the scan window (e.g., 2 APs=20%) sufficient to trigger a reduction in scan window time.

Figure 5:
FIG. 5 illustrates a timing diagram 500 in accordance with an embodiment of the present disclosure.

FIG. 5 illustrates a timing diagram 500 in accordance with an embodiment of the present disclosure. Timing diagram 500 illustrates timing corresponding to concurrent communications sent and received from a microAP in accordance with an embodiment. In accordance with an embodiment, timing diagram 500 illustrates communications corresponding to microAP system 400 as shown in FIG. 4.

The top timing diagram in FIG. 5 corresponds to communications transmitted from a microAP operating in an AP communications mode, while the lower timing diagram corresponds to communications sent and/or received from a microAP operating in a STA communications mode. As shown in FIG. 5, a microAP ordinarily transmits N periodic beacon frames. However, while operating in an STA communications mode, a microAP also performs channel scanning within one or more channel subgroup. During these scanning periods, beacon frames are not transmitted while the microAP continues to function as an AP. Therefore, beacon frames 1 and N are transmitted from microAP, while beacon frame 2 (and any subsequent beacon frames prior to beacon frame N) are not. Timing diagram 500 illustrates beacon frames 1 and N transmitted by microAP as solid lines and beacon frames 2, which is ordinarily transmitted but is not due to an ongoing channel subgroup scan, as having dashed lines.

In accordance with various embodiments, a microAP is configured to perform channel subgroup scanning passively or actively to determine APs available for provisioning. As shown in FIG. 5, "AP requests" are indicated with dashed lines because they are only transmitted in embodiments implementing active scanning on each channel scanned within the channel subgroup. Further in accordance with active scanning embodiments, "AP responses" are received from APs responding to the requests on each channel scanned within the channel subgroup. Therefore, for active scanning embodiments, the subgroup channel scanning window occurs over the time period denoted as t1 in FIG. 5.

In accordance with passive scanning embodiments, a microAP only listens for beacon frames transmitted on each channel scanned within the channel subgroup ("AP beacons"). Therefore, for passive scanning embodiments, the subgroup channel scanning window occurs over the time period denoted as t2 in FIG. 5.

In accordance with various embodiments, microAP system 400 adjusts a DTIM period value based on desired channel subgroup scanning windows. In accordance with additional embodiments, microAP system 400 adjusts the number of channel subgroups scanned to ensure all channels within a particular channel subgroup are scanned within the time period associated with the DTIM interval period value.

In accordance with a DTIM period adjustment embodiment, parameter optimization module 410 calculates the number N of beacons that are needed based on the duration of scanning window t1. For example, the overall time period associated with N number of beacon intervals is associated with a DTIM interval, shown in FIG. 5 as t3. If scanning window t1 occurs over 250 ms and the beacon intervals are 102.4 ms apart, then parameter optimization module 410 sets the DTIM period value to 3 beacons, since t3>t1 when N=3. In other words, scanning window t1 occurs over a period of time that is less than three beacon frame transmittal periods. In accordance with such as embodiment using this example, microAP system 400 transmits this DTIM period value to communication devices connected to microAP system 400 prior to the channel subgrouping scan taking place. In other words, the DTIM period value is transmitted once the channel subgrouping is determined and the appropriate DTIM interval is determined. As a result, the subgroup scanning window t1 fits within the DTIM interval as shown in FIG. 5. The communication devices connected to microAP expect the "data traffic," as shown in FIG. 5, to be broadcasted from the microAP once a number of beacon interval periods associated with the DTIM interval have elapsed.

In accordance with subgroup channel adjustment embodiments, channel grouping module 406 selects a channel subgrouping so subgroup channel scans fit inside the DTIM interval represented by t3. In accordance with active scan embodiments, channel grouping module 406 selects a subgroup channel scan window illustrated by t1. In accordance with passive scan embodiments, channel grouping module 406 selects a subgroup channel scan window illustrated by t2. Subgroup channel adjustment embodiments may be useful when a DTIM period value provides desirable performance, or changing the DTIM period value is difficult or impractical.

For example, assuming N in FIG. 5 is 3 beacon frame transmission intervals. If a beacon frame is transmitted every 102.4 ms, then the DTIM interval may be expressed by Eqn. I below:

$$\text{DTIM interval} = (N-1)(\text{beacon frame transmission interval}) = 204.8 \text{ ms} \quad \text{Eqn. 1:}$$

In accordance with such an example, channel grouping module 406 calculates a maximum number of channels that can be scanned within this DTIM interval. If 100 ms is required per channel scan, then channel grouping module 406 selects a channel subgroup schedule having a maximum of 2 subgroup channels. In such a case, using the previous example of 11 channels, an exemplary channel subgrouping might be, for example, 1-2, 3-4, 5-6, 7-8, 9-10, and 11. Once the channel subgroup scan is completed, any buffered data is transmitted to clients hosted by the microAP as "data traffic," as shown in FIG. 5. Communication devices connected to microAP system 400 are configured to wait for a number of beacon intervals corresponding to the DTIM period value before disconnecting. Therefore, fitting the channel subgroup scan within the DTIM window allows communication devices connected to microAP system 400 to remain connected while microAP system 400 obtains information regarding available APs for provisioning. As a result, communication devices connected to microAP system 400 remain connected throughout the provisioning process and while this information is being obtained. Once each channel subgrouping scan is completed, microAP system 400 optionally repeats the subgroup scanning, beacon transmission, and data traffic transmission until all communication channels have been scanned.

Figure 6:
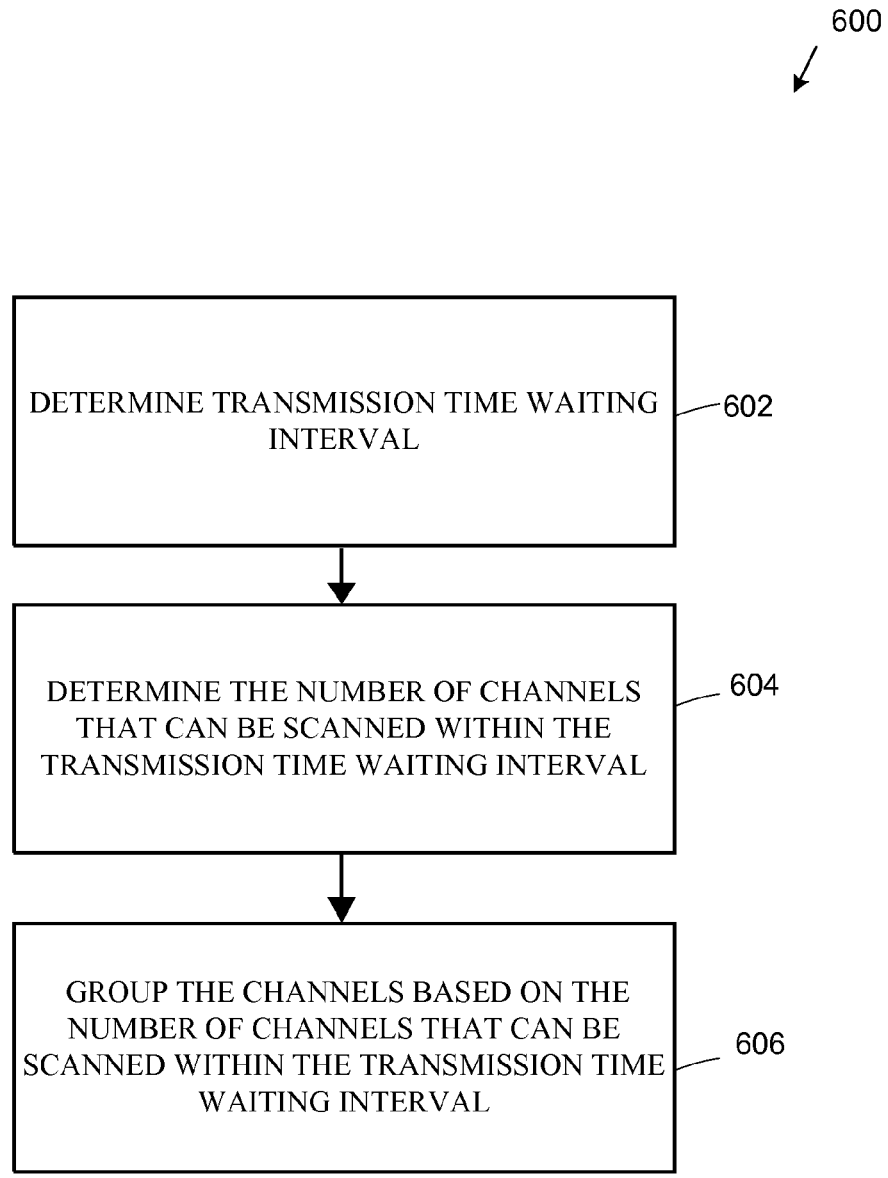
FIG. 6 illustrates a channel subgroup selection method 600 in accordance with an embodiment of the present disclosure.

FIG. 6 illustrates a channel subgroup selection method 600 in accordance with an embodiment of the present disclosure. In an embodiment, channel subgroup selection method 600 is implemented as part of microAP system 400, as shown in FIG. 4.

Method 600 begins at block 602, at which a communication device determines a transmission waiting time interval corresponding to communications between the communication device and another communication device. This transmission waiting time interval could include, for example, a DTIM beacon interval period based on a current DTIM period value.

At block 604, the communication device determines a number of channels that can be scanned within the transmission time waiting interval. This transmission time waiting interval could include, for example, the DTIM interval period corresponding to t3, as shown in FIG. 5.

At block 606, the communication device groups the channels based on the number of channels that can be scanned within the transmission time waiting interval. In an embodiment, this grouping is performed by channel grouping module 406, as shown in FIG. 4.

Figure 7:
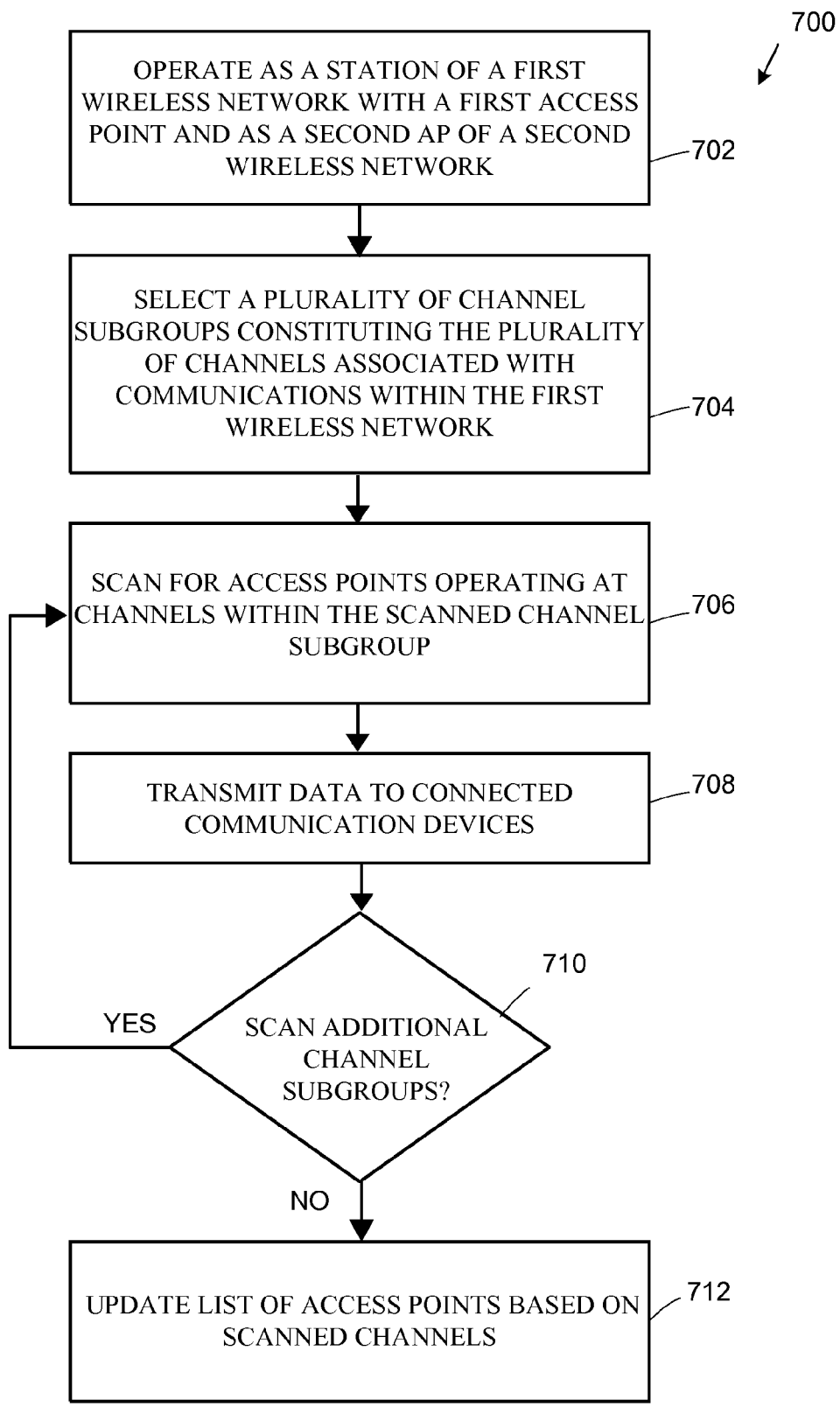
FIG. 7 illustrates a channel subgroup scanning method 700 in accordance with an embodiment of the present disclosure.

FIG. 7 illustrates a channel subgroup scanning method 700 in accordance with an embodiment of the present disclosure. In an embodiment, channel subgroup selection method 700 is implemented as part of microAP system 400, as shown in FIG. 4.

Method 700 begins at block 702, at which a communication device operates as a station of a first wireless network with a first AP and as a second AP of a second wireless network. This first AP could include, for example, AP 14-1 and/or 14-2 as shown in FIG. 1, and the first network could include communications between the communication device and AP 14-1 and/or AP 14-2. This second AP could include, for example, client 25-3 as shown in FIG. 1, and the second network could include communications between the client 25-3 and client 25-1 and/or client 25-2.

At block 704, the communication device selects a plurality of channel subgroups constituting the plurality of channels associated with communications within the first wireless network. These plurality of channel subgroups could be selected, for example, by channel grouping module 406, as shown in FIG. 4. In accordance with an embodiment, block 704 is an implementation of channel subgroup selection method 600, as shown in FIG. 6.

At block 706, the communication device scans for access points operating at channels within the scanned channel subgroup. For example, this scanning could be performed, for example, by controller 404, as shown in FIG. 4. In accordance with an embodiment, this scanning occurs as the first communication device operates in a station mode.

At block 708, the communication device transmits data to connected communication devices. For example, this data could be transmitted by microAP system 400 to connected clients while operating in an AP mode.

At block 710, the communication device determines whether additional channel subgroups remain to be scanned. For example, this determination could be made by controller 404 using the channel subgrouping schedule selected by channel grouping module 406, as shown in FIG. 4. If no additional channel subgroups need to be scanned, then method 700 continues to block 712. Otherwise, method 700 reverts back to block 706 to scan additional subgrouped channels.

At block 712, the communication device updates a list of available APs for provisioning based on the scanned channel subgroups. This updating could be performed, for example, by controller 404 in microAP system 400, as shown in FIG. 4.

Although various embodiments are disclosed herein separately, the embodiments as described may be combined. For example, although FIG. 2 and FIG. 4 describe separate embodiments, a single embodiment could include any combination of signal strength measurement module 206, channel grouping module 406, and/or parameter optimization module 410.

The Figures presented herein are for illustrative purposes. Communications and/or couplings between various elements illustrated throughout the Figures may be performed using any type of coupling or means of communications to accomplish the corresponding operations as described herein. For example, even though single lines are used to illustrate communications between some elements, this communication may be implemented with any number of wires and/or buses. Furthermore, such communications may be implemented with any appropriate communication protocol, such as serial or parallel communications, regardless of the illustrated couplings.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable storage medium such as on a magnetic disk, an optical disk, in a RAM or ROM or flash memory, tape drive, etc. Likewise, the software or firmware instructions may be delivered to a user or a system via any known or desired delivery method. The software or firmware instructions may include machine readable instructions that, when executed by the processor, cause the processor to perform various acts.

When implemented in hardware, the hardware may comprise one or more of discrete components, an integrated circuit, an ASIC, a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

In accordance with such an embodiment, a microAP client may calculate and broadcast a number of beacon interval time periods required to complete the channel subgroup scanning. Once this beacon number is reached, data is transmitted to the connected clients. The clients will remain connected in this case, since they are aware of the delay in transmission due to scanning and wait for the appropriate number of beacons to be received. In this way, client 25-4 increases the time before connected clients disconnect by providing them with feedback regarding when to expect data transmissions.

What is claimed:

1. A first communication device, comprising:
a controller configured to:
(i) operate the first communication device as a station in a first wireless network with a first access point (AP) conforming to a communications protocol having a plurality of channels, and (ii) operate the first communication device as a second AP in a second wireless network with a second communication device concurrently with operating the first communication device as the station in the first wireless network;
determine a transmission time waiting interval corresponding to transmissions from the first communication device to the second communication device while the first communication device operates as the second AP in the second wireless network; and
determine a number of channels from the plurality of channels that can be scanned within the transmission time waiting interval while the first communication device operates as the station in the first wireless network; and
a channel grouping module configured to group the plurality of channels into a plurality of channel subgroups based on the determined number of channels,
wherein the controller is further configured to scan a channel subgroup from the plurality of channel subgroups within the transmission time waiting interval to identify APs other than the first AP while the first communication device operates as the station in the first wireless network; and
wherein the channel grouping module is implemented by the controller or another controller.

2. The device of claim 1, wherein the transmission time waiting interval comprises:
a time duration associated with a number of beacon frames transmitted corresponding to a delivery traffic indication message (DTIM) period value.

3. The device of claim 2, wherein the controller is further configured to cause the first communication device to send a beacon frame including a DTIM to the second communication device after scanning each channel subgroup from the plurality of channel subgroups.

4. The device of claim 2, further comprising:
a parameter optimization module configured to adjust the DTIM period value based on the number of channels from the plurality of channels that can be scanned within the time duration, and wherein the controller is further configured to cause the first communication device to send the adjusted DTIM period value to the second communication device,
wherein the parameter optimization module is implemented by the controller or the other controller.

5. The device of claim 4, wherein the parameter optimization module is further configured to increase the DTIM period value when the number of subgrouped channels cannot be scanned within the time duration.

6. The device of claim 1, wherein the controller is further configured to scan the channel subgroup by monitoring beacons received from APs broadcasting on the channel subgroup.

7. The device of claim 1, wherein the controller is further configured to scan the channel subgroup by (i) sending requests to APs broadcasting on the channel subgroup, and (ii) monitoring responses received from APs broadcasting on the channel subgroup sent in response to the requests.

8. The device of claim 1, wherein the controller is further configured to cause the first communication device to provision the second communication device with the first AP.

9. The device of claim 1, wherein the channel grouping module is further configured to:

group the plurality of channels into the plurality of channel subgroups based on a maximum number of channels that can be scanned within the transmission time waiting interval.

10. A method, implemented in a first communication device, comprising:
operating the first communication device as a station in a first wireless network with a first access point (AP) conforming to a communications protocol having a plurality of channels;
operating the first communication device as a second AP in a second wireless network with a second communication device concurrently with operating the first communication device as the station in the first wireless network;
determining, by the first communication device, a transmission time waiting interval corresponding to transmissions from the first communication device to the second communication device while the first communication device operates as the second AP;
determining, by the first communication device, a number of channels from the plurality of channels that can be scanned within the transmission time waiting interval while the first communication device operates as the station in the first wireless network;
grouping, by the first communication device, the plurality of channels into a plurality of channel subgroups based on the determined number of channels; and
scanning, by the first communication device, a channel subgroup from the plurality of channel subgroups within the transmission time waiting interval to identify APs other than the first AP while the first communication device operates as the station in the first wireless network.

11. The method of claim 10, wherein the transmission time waiting interval comprises:
a time duration associated with a number of beacon frames transmitted by the first communication device corresponding to a delivery traffic indication message (DTIM) period value.

12. The method of claim 11, further comprising:
sending, by the first communication device, a beacon frame including a DTIM to the second communication device after scanning each channel subgroup from the plurality of channel subgroups.

13. The method of claim 11, further comprising:
adjusting, by the first communications device, the DTIM period value based on the number of channels from the plurality of channels that can be scanned within the time duration; and
sending, by the first communication device, the adjusted DTIM period value to the second communication device.

14. The method of claim 13, wherein the act of adjusting comprises:
increasing the DTIM period value when the number of subgrouped channels cannot be scanned within the time duration by the first communication device.

15. The method of claim 10, wherein the act of scanning comprises:
monitoring beacons received from APs broadcasting on the channel subgroup.

16. The method of claim 10, wherein the act of scanning comprises:
(i) sending requests to APs broadcasting on the channel subgroup; and
(ii) monitoring responses received from APs broadcasting on the channel subgroup sent in response to the requests.

17. The method of claim 10, further comprising:
provisioning, at the first communication device, the second communication device with the first AP.

18. The method of claim 10, wherein the act of grouping comprises:
grouping the plurality of channels based on a maximum number of channels that can be scanned by the first communication device within the transmission time waiting interval.

* * * * *